United States Patent
Terada et al.

(10) Patent No.: US 6,276,160 B1
(45) Date of Patent: Aug. 21, 2001

(54) ICE MAKER WITH A MOTOR HAVING GEARS WITH MEANS TO INTERMITTENTLY ROTATE A GEAR THEREOF

(75) Inventors: Yoshiaki Terada; Yoshihiko Nakajima; Akabane Tokuyuki, all of Nagano (JP)

(73) Assignee: Sankyo Seiki Mfg. Co, Ltd., Nagano-ken (JP)

( * ) Notice: Subject to any disclaimer, the term of this patent is extended or adjusted under 35 U.S.C. 154(b) by 0 days.

(21) Appl. No.: 08/942,109

(22) Filed: Oct. 1, 1997

Related U.S. Application Data

(63) Continuation-in-part of application No. 08/883,180, filed on Jun. 26, 1997.

(30) Foreign Application Priority Data

Jun. 28, 1996 (JP) .................................................. 8-188640
Oct. 1, 1996 (JP) .................................................. 8-280086

(51) Int. Cl.$^7$ ................................. F25C 1/10; F16H 1/20
(52) U.S. Cl. ................................. 62/353; 74/435; 74/437; 74/84 R; 310/83
(58) Field of Search ............................. 74/435, 436, 437, 74/404, 84 R; 310/83, 84, 62, 162; 62/353

(56) References Cited

U.S. PATENT DOCUMENTS

| 1,758,206 | * | 5/1930 | Ryan et al. | 74/435 |
| 2,399,925 | * | 5/1946 | Hewlett, Jr. | 74/435 |
| 2,881,630 | * | 4/1959 | Opocensky | 74/435 |
| 3,276,225 | * | 10/1966 | Linstromberg | 62/353 |
| 3,727,427 | * | 4/1973 | Eyman, Jr. et al. | 62/353 |
| 3,747,420 | * | 7/1973 | Weber et al. | 74/84 R |
| 3,813,952 | * | 6/1974 | Fehrenbacher | 74/84 R |
| 3,883,758 | * | 5/1975 | Lechner | 310/83 |
| 4,104,859 | * | 8/1978 | Ogihara et al. | 310/83 |
| 4,223,528 | * | 9/1980 | Vuilleumier | 74/436 |
| 4,311,059 | * | 1/1982 | Wagle | 74/435 |
| 4,697,432 | * | 10/1987 | Cole | 62/353 |

FOREIGN PATENT DOCUMENTS 62-260541  12/1987  (JP) .

* cited by examiner

Primary Examiner—David A. Bucci
Assistant Examiner—William C Joyce
(74) Attorney, Agent, or Firm—Reed Smith LLP

(57) ABSTRACT

A motor having gears which transmit rotations of a rotor to an output shaft through a gear mechanism made of gear trains, comprises a gear mechanism provided with an intermittent rotation mechanism including a primary gear which rotates upon receiving rotations of the rotor and a secondary gear which meshes with the primary gear and rotates intermittently. The primary gear has a tooth unit for driving the secondary gear, a tooth-shaped hole, which is provided adjacent to one side of the tooth unit and with which a meshing tooth of the secondary gear meshes, and a control unit which is provided adjacent to the other side of the tooth unit so as to stop the secondary gear for a given period such that the primary gear is asymmetric around the tooth unit. When the primary gear rotates in a predetermined direction, the meshing tooth meshes with the tooth-shaped hole to intermittently rotate the secondary gear. When the primary gear rotates in a direction oppoite to the predetermined direction, the meshing tooth contacts the control unit to stop the secondary gear and rotate the primary gear in reverse of the predetermined rotational direction.

7 Claims, 10 Drawing Sheets

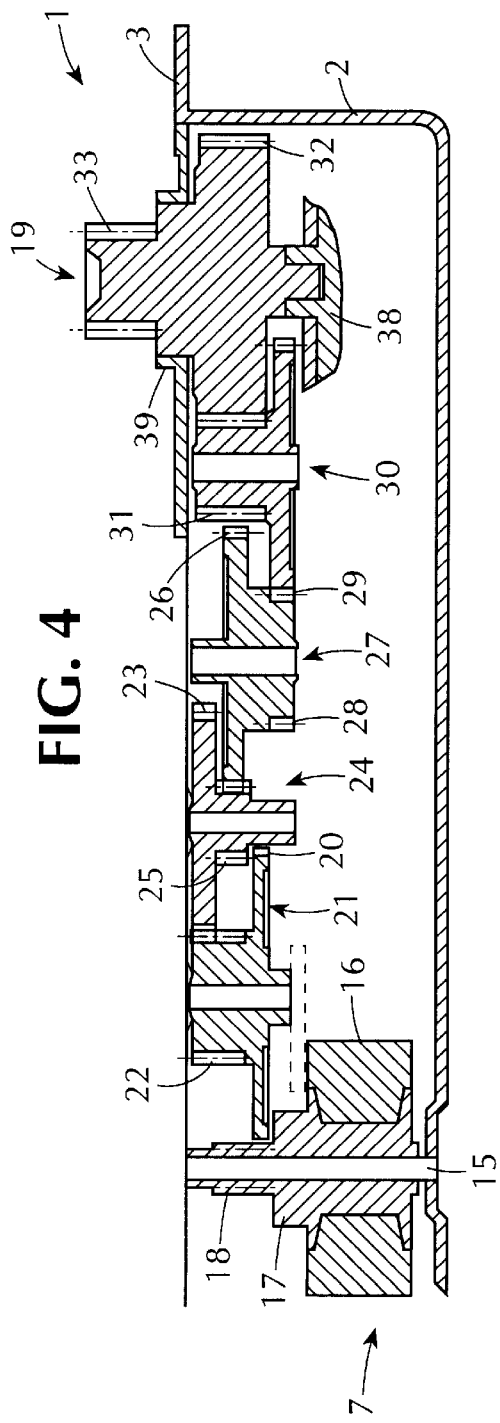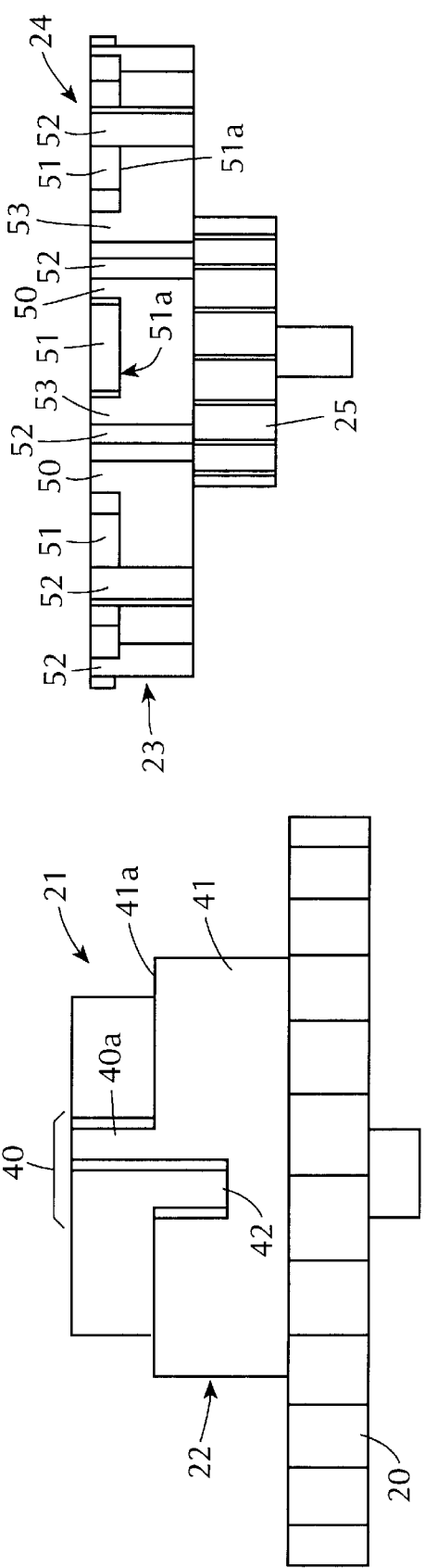

ICE MAKER WITH A MOTOR HAVING GEARS WITH MEANS TO INTERMITTENTLY ROTATE A GEAR THEREOF

CROSS-REFERENCE TO RELATED APPLICATIONS

This is a continuation-in-part of U.S. patent application Ser. No. 08/883,180 filed Jun. 26, 1997.

BACKGROUND OF THE INVENTION a) Field of the Invention

The present invention relates to a motor having gears which comprises a gear mechanism such as a decelerating gear mechanism. It specifically relates to an improvement of a motor having gears, etc., with which unstable rotations of a rotor in the motor produced during start-up are stabilized in a predetermined direction.

It further relates to an ice maker using a motor having gears, which rotates at low speed and controls torque at a low level.

b) Description of the Related Art

Conventionally, there is a motor having gears which comprises a gear mechanism such as a decelerating gear mechanism and to which an AC sync motor is applied as a driving source. In such a motor having gears, the rotational direction of a rotor is not stable during start-up. In order to stabilize the rotational direction, a shading coil is added or a lever for preventing reversed rotations (as disclosed in JP Kokai S62-260541) is provided.

This conventional use of a shading coil or a lever for preventing reversed rotations brought an attendant complicated structure and also increased the number of components. This resulted in increased time required for assembling and increased manufacturing cost. In addition, a motor employing a lever for preventing reversed rotations generates a clashing noise with reversed rotations, that is, a clashing noise occurs between a projection unit of a rotor and the lever for preventing reversed rotations. This has been a problem when the motor is used in quiet circumstances.

A conventional ice maker using the above mentioned motor having gears is configured such that a boundary between ice and an ice making tray is melted by a heater provided at the ice making tray and an ice removing member is rotated to slide and drop ice from the ice making tray into an ice storage container.

Because the motor having gears includes a decelerating gear mechanism, the motor rotates at low speed and requires high torque. While the number of rotations is decreased at an output shaft portion, the torque at the output shaft is increased to rotate an ice removing member with a high torque for an infallible operation. With this, ice on the ice making tray is smoothly separated therefrom and dropped into the ice storage container.

In a conventional ice maker, however, the boundary between ice and the ice making tray is sometimes not completely melted by conducting heat from the heater at the ice making tray to melt the boundary. In addition, to simplify a switching control, one may want to actuate the motor having gears simultaneously with conducting heat from the heater. In such a case, at the beginning of rotation of the motor, regardless of the attempts of removing ice by the ice removing member, ice is not separated from the ice making tray because of the attachment of ice to the ice making tray. This results in interrupting the operation of the ice removing member. In other words, the output shaft of the motor having gears comes into a locked status (interrupted operation). Then, high torque is added to the gears in gear trains formed in the motor having gears, which may damage teeth.

Such a risk of damaging teeth is normal in a motor having gears, which requires to be rotated at low speed, because of tendency of producing high torque. For this reason, a motor having gears to which a conventional AC sync motor is applied is used in such a way that the gear is reinforced with additional cost, or, in contrast, the number of rotations is kept higher. An ice maker having a motor having gears attempts to solve the above problems by sufficiently melting ice with a heater, more precisely controlling conduction of the heater, or employing a large-size motor. These countermeasures, however, result in costing too much, decreasing efficiency in assembly, making a large device, or melting too much of the ice. On the other hand, an ice maker without these countermeasure is broken in a short period, and thus its usable life is short.

OBJECT AND SUMMARY OF THE INVENTION

The present invention is directed to providing a motor having gears in which, without having additional mechanisms or deforming the shape of a motor unit, rotations of a rotor can be controlled in a predetermined direction in a quiet manner.

Another objective of the present invention is directed to providing a motor having gears in which no extra mechanisms are added, a shape of the motor portion is not changed, rotation is at low speed, and torque is not high. Yet another objective of the present invention is directed to providing an ice maker, in which gears are not damaged even when drive members such as an ice removing member is in a so-called locked state, and a stable operation can be obtained for a long period.

In accordance with the invention, a motor having gears which transmit rotations of a rotor to an output shaft through a gear mechanism made of gear trains, comprises a gear mechanism provided with an intermittent rotation mechanism including a primary gear which rotates upon receiving rotations of the rotor and a secondary gear which meshes with the primary gear and rotates intermittently. The primary gear has a tooth unit for driving the secondary gear, a tooth-shaped hole, which is provided adjacent to one side of the tooth unit and with which a meshing tooth of the secondary gear meshes, and a control unit which is provided adjacent to the other side of the tooth unit so as to stop the secondary gear for a given period such that the primary gear is asymmetric around the tooth unit. When the primary gear rotates in a predetermined direction, the meshing tooth meshes with the tooth-shaped hole to intermittently rotate the secondary gear. When the primary gear rotates in a direction opposite to the predetermined direction, the meshing tooth contacts the control unit to stop the secondary gear and rotate the primary gear in reverse of the predetermined rotational direction.

BRIEF DESCRIPTION OF THE DRAWINGS

In the drawings:

FIG. 4 illustrates a diagram of development of a gear train showing the relation of each gear of the motor having gears of FIG. 2;

FIG. 5 illustrates a side view of a first gear of the motor having gears of FIG. 2;

FIG. 6 illustrates a side view of a second gear of the motor having gears of FIG. 2;

DESCRIPTION OF THE PREFERRED EMBODIMENTS

Embodiments of the present invention are described hereinafter referring to FIGS. 1 through 14. Note that a first embodiment is first described referring to FIGS. 1 through 9.

Figure 2:
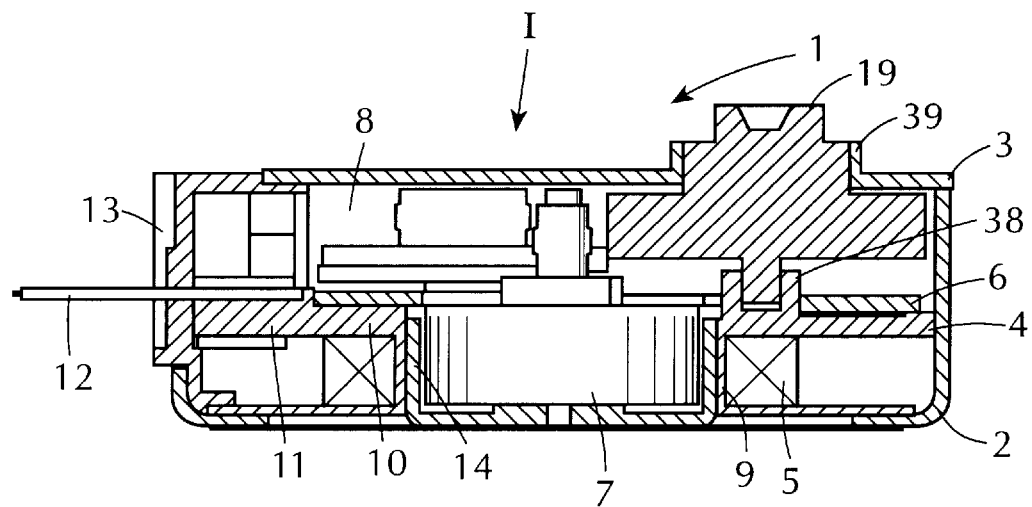
FIG. 2 illustrates a cross-sectional view of the motor having gears of the present invention.
Figure 3:
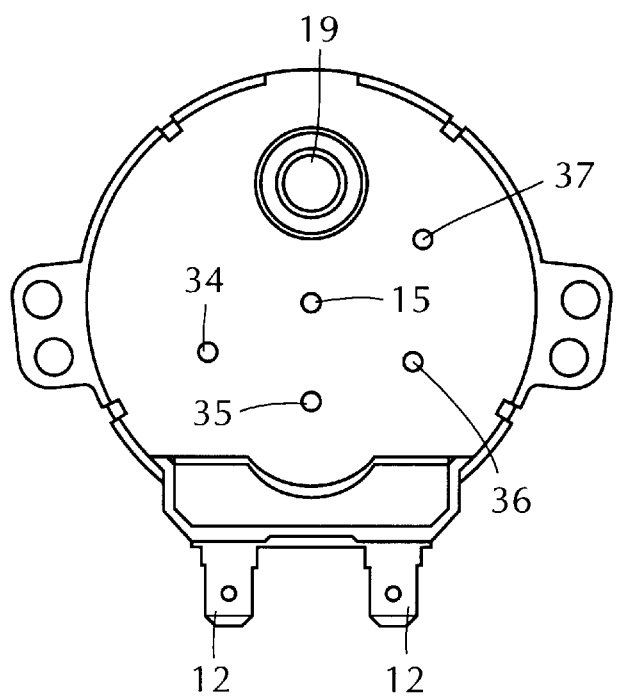
FIG. 3 illustrates a plan view from the arrow I of FIG. 2.

A motor having gears 1 comprises, as shown in FIG. 2, a stator substrate 2 which also functions as a bottom case, a lid case 3 which is attached onto the top of the substrate 2, a coil bobbin 4, a coil wire 5, a stator substrate 6, a rotor 7, and a gear mechanism 8 made of a decelerating gear train.

The stator substrates 2 and 6 are both made of magnetic sheets, and are secured sandwiching the coil bobbin 4 therebetween. The coil bobbin 4 is made of an insulator such as plastic; it has a hollow cylindrical spool 9 and flanges 10 integrally formed at both ends of the spool 9 respectively.

The outer surfaces of the flanges 9 contact the stator substrates 2 and 6. The coil wire 5 is wound around the outer circumference of the spool 9; it is to be connected to an external power source via a terminal 12 on a terminal seat 11 molded together with the flange 10. The terminal 12 is projected externally from a terminal cover 13.

The stator substrates 2 and 6 are attached on the side surfaces of the flange 10 respectively. Provided on the stator substrates 2 and 6 are a plurality of comb-shaped pole teeth 14 which is made being bent along the inside of the cylindrical spool 9 connecting the facing flanges 10. These pole teeth 14 are arranged on the inner circle of the spool 9, facing the outer circle of the rotor 7.

The rotor 7 has a circular permanent magnet 16 and a rotor gear unit 17 positioned at the center inside the circular magnet 16. The rotor 7 is rotatably supported with respect to a rotor shaft 15 fixed between the stator substrate 2, which functions as a bottom case, and the lid case 3. Note that the permanent magnet 16 is magnetized such that different magnetic poles are alternate around its outer circle surface; it faces the pole teeth 14 putting small space therebetween. The rotation of the rotor 7 is transmitted to an output shaft 19 via the gear mechanism 8 including a pinion 18 of the rotor gear unit 17.

The gear mechanism 8 comprises the pinion 18, a first gear 21 having a gear unit 20 which meshes with the pinion 18 and includes a primary gear 22, a second gear 24 having a secondary gear 23 which meshes with the primary gear 22 of the first gear 21, a third gear 27 having a gear unit 26 which meshes with a pinion unit 25 of the second gear 24, a fourth gear 30 having a gear unit 29 which meshes with a pinion unit 28 of the third gear 27, and an output shaft 19 having a gear unit 32 which meshes with a pinion unit 31 of the fourth gear 30. Note that an output gear unit 33 is provided to the output shaft 19 for further transmitting the rotation.

These gears 21, 24, 27, and 30 are rotatably supported by gear shafts 34, 35, 36, and 37 arranged between the stator substrate 6 and the lid case 3.

The output shaft 19 is molded of resin such that its shaft portion is attached together with the output gear 33 and the gear unit 32 on the output side. Also, the output shaft 19 is rotatably supported by a bearing unit 38 of the flange 10 which is projected from a hole in the stator substrate 6 and a radial bearing unit 39 which is projected from the lid case 3 by drawing. The output gear unit 33 of the output shaft 19 is to be connected to electric machines to which the motor is installed, such as a driving mechanism for turning a lever used for getting ice out of an ice box in freezers and a driving mechanism for turning a turn-table in a microwave unit.

The first gear 21 has gear unit 20 and primary gear 22. As shown in FIG. 5, provided to the primary gear 22 are a tooth unit 40 which meshes with the secondary gear 23 in the second gear 24 and a control unit 41 used for stopping the second gear 24. In addition, a tooth-shaped hole 42 is formed in the control unit 41 such that it is adjacent to a tooth 40a, one of the teeth in the tooth unit 40. Note that in this embodiment, the tooth unit 40 is made of one tooth 40a, and also the tooth-shaped hole 42 is provided as one. Also, an intermittent rotation mechanism comprises primary and secondary gears 22 and 23. The diameter at the root of tooth unit 40 is made smaller than that of control unit 41.

Figure 10:
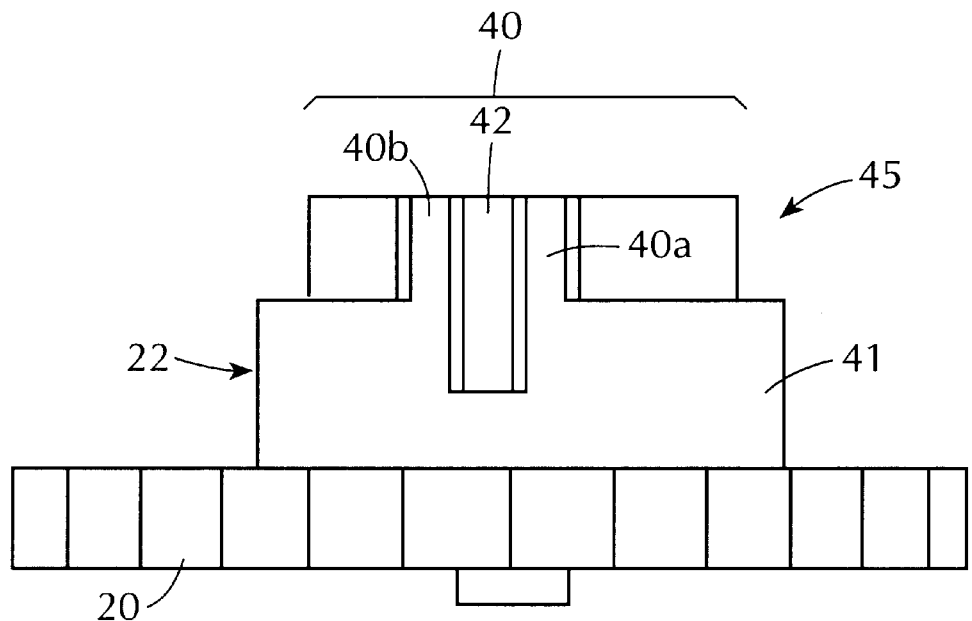
FIG. 10 illustrates a side view of the first gear of the motor having gears of a second embodiment of the present invention.

The first gear 21 is made asymmetric by notching a tooth 40b in FIG. 10 so as to obtain an intermittent rotation mechanism with one-way rotation, as described later.

The second gear 24 has the secondary gear 23 and the pinion unit 25. As shown in FIG. 6, the secondary gear 23 includes a first fitting unit 50 with which the tooth 40a of the tooth unit 40 meshes when the first gear 21 rotates counterclockwise in FIG. 1, a transmitting unit 51 to which the rotation is transmitted via the tooth 40a, a meshing tooth 52 which fits into the tooth-shaped hole 42, and a second fitting unit 53 with which the tooth 40a of the tooth unit 40 meshes for preventing further rotations when the first gear 21 rotates clockwise in FIG. 9.

Note that while the first and second gears 21 and 24 are not transmitting the rotations, the outer circle surface of the control unit 41 of the first gear 21 contacts the two meshing teeth 52 and 52. This creates a condition where the rotation of the second gear 24 is prevented. Further, at this time, a bottom surface 51 a of the transmitting unit 51 of the second gear 24 is opposite a top surface 41 a of the control unit 41. Moreover, the tooth 40a has an involute tooth profile, and each meshing tooth 52 which contacts the tooth 40a and a contact surface of the transmitting unit 51 have also an involute tooth profile; however, other tooth profiles may be used.

An operation of the motor having gears 1 configured in the above manner is described below.

Figure 8:
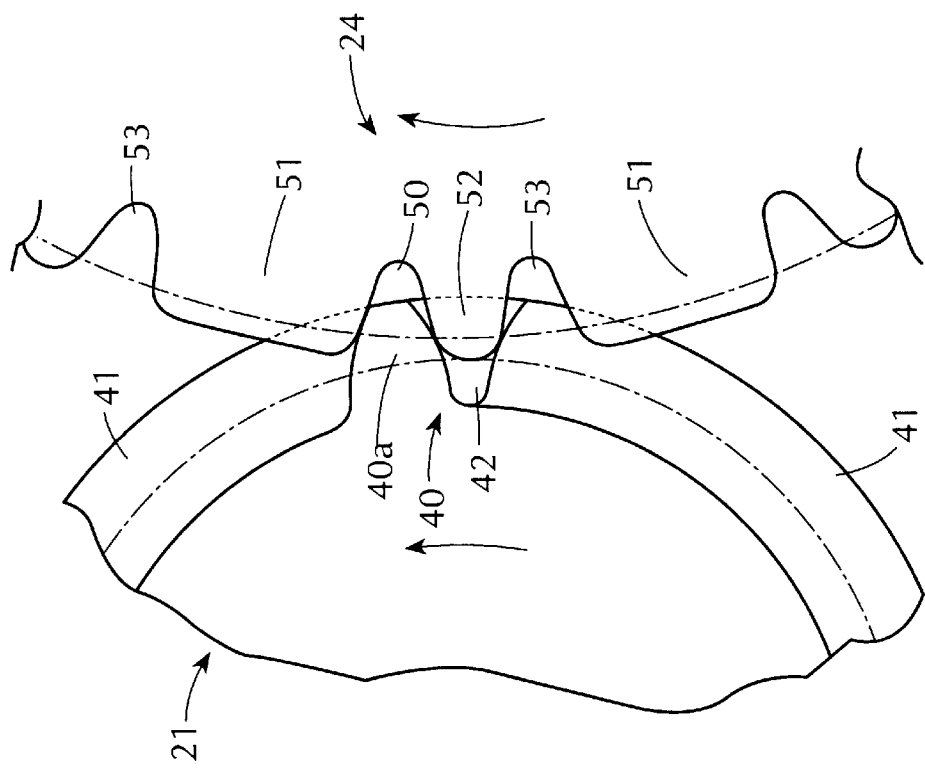
FIG. 8 is a drawing illustrating the status when rotation is transmitted from the first gear to the second gear of the motor having gears of FIG. 2, showing the meshed condition.
Figure 7:
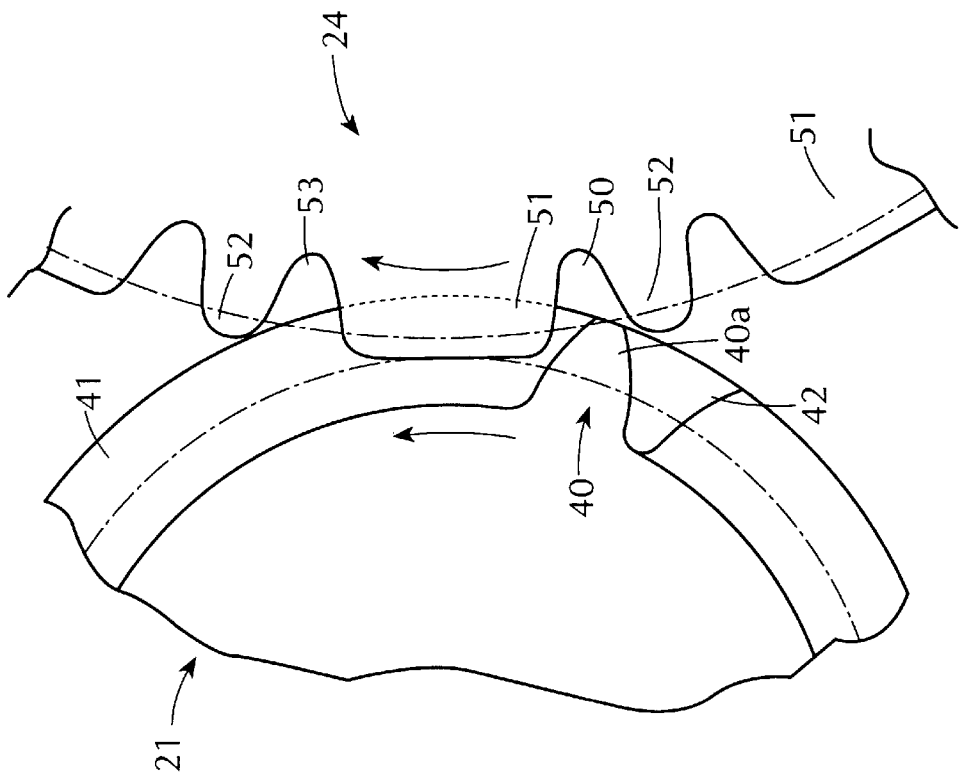
FIG. 7 is a drawing for describing the status when the rotation is transmitted from the first gear to the second gear of the motor having gears of FIG. 2, showing the status right before meshing.

When the stator substrates 2 and 6 are excited by the coil wire 5, the rotor 7 rotates in either direction through a magnetic mutual action. When the rotor 7 rotates clockwise in FIG. 1 at this time, the first gear 21 rotates counterclockwise. Then, as shown in FIGS. 7 and 8, the tooth 40a meshes with the first fitting unit 50 and transmits the rotation to the transmitting unit 51 to rotate the second gear 24 clockwise. With the transmitted rotation, the meshing tooth 52 meshes with the tooth-shaped hole 42, and thus the rotation continues. Once the tooth 40a comes out from the first fitting unit 50, the outer circle surface of the control unit 41 contacts the two meshing teeth 52 and 52, thus preventing the second gear 24 from rotating. Meanwhile, gear 21 continues rotating; tooth 40a comes close to second gear 24 again, and then it meshes with the next first fitting unit 50. In this manner, second gear 24 rotates intermittently. This decelerates the rotation to a great extent when it is transmitted from the first gear 21 to the second gear 24. The rotation of the rotor 7 is transmitted to the output shaft 19 via gear mechanism 8, which is a decelerating gear train made of gears 21, 24, 27, and 30; then, it is transmitted, as a rotational action, to a member to be driven.

Figure 1:
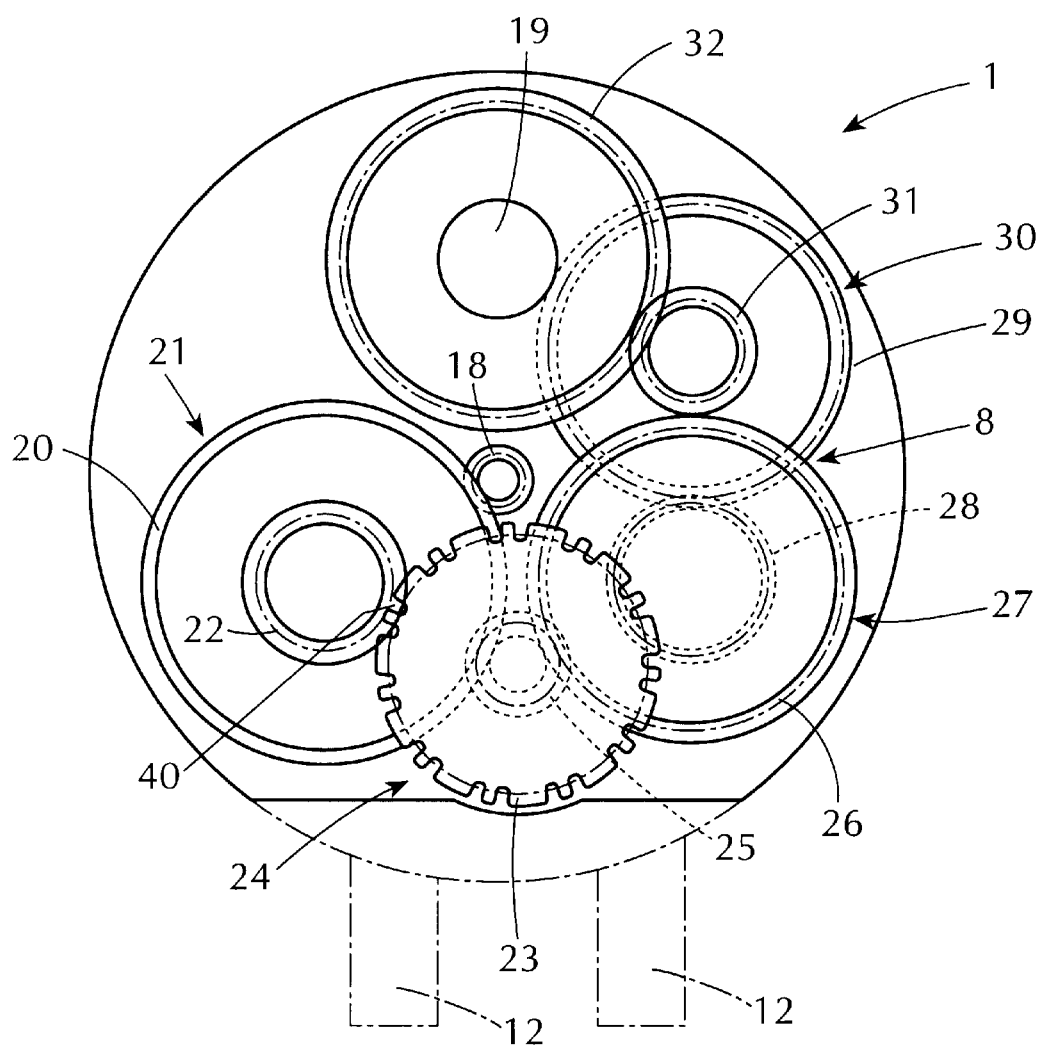
FIG. 1 illustrates a plan view showing the relation of each gear in a motor having gears of a first embodiment of the present invention; this is a major plan view seen from the arrow I direction of FIG. 2 and a lid case is removed.
Figure 9:
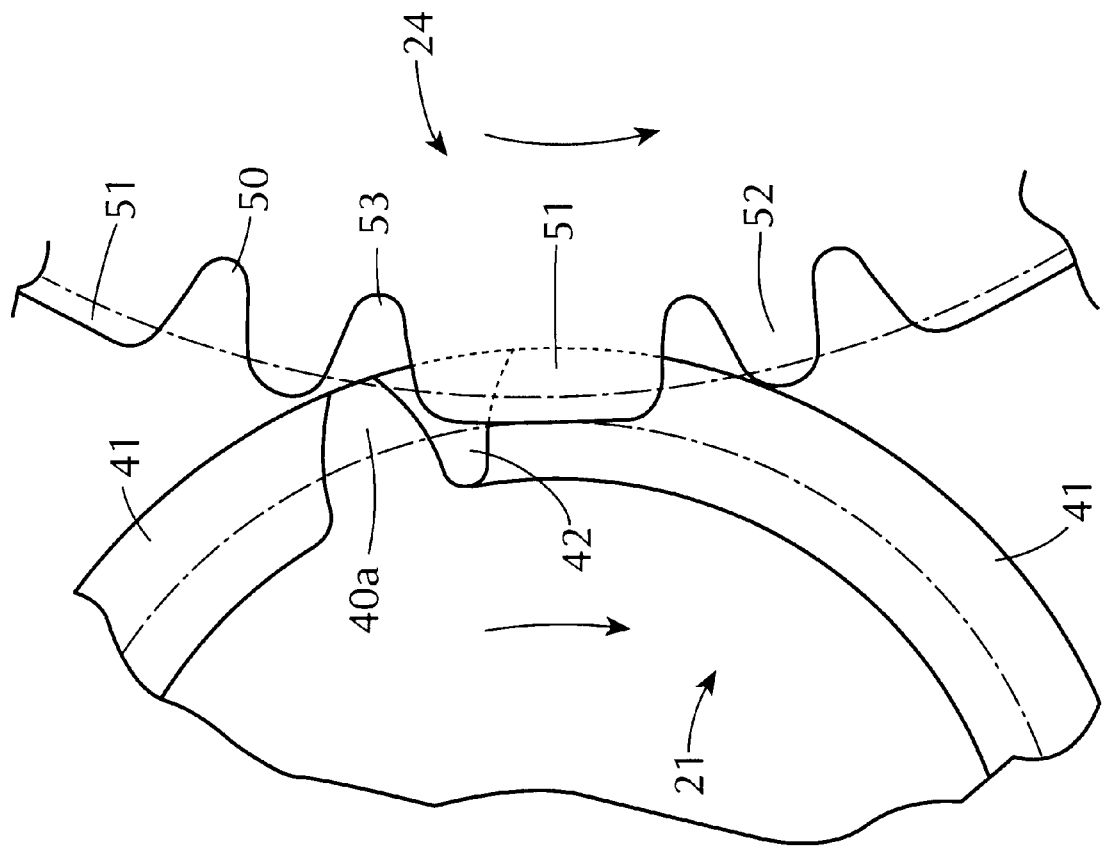
FIG. 9 is a drawing illustrating the status when the rotation is not transmitted from the first gear to the second gear of the motor having gears of FIG. 2.

On the other hand, when the rotor 7 rotates counterclockwise in FIG. 1, first gear 21 rotates clockwise. Then, as shown in FIG. 9, tooth 40a meshes with second fitting unit 53 and tends to push unit 51 thereadjacent in the rotating direction. However, meshing tooth 52 adjacent to the second fitting unit 53 comes in contact with the outer circle of the control unit 41, thus stopping the rotation of the second gear 24. As a result, the rotor 7 starts rotating in reverse. In other words, the rotor 7 starts rotating clockwise in FIG. 1, and then the first gear 21 rotates counterclockwise. With this, tooth 40a meshes with the first fitting unit 50 provided opposite the second fitting unit 53 interposing the transmitting unit 51, making it possible to transmit the rotations.

As described, even when the rotor 7 rotates in either direction, the rotation in only the predetermined direction is transmitted due to the intermittent rotation mechanism comprising the first and second gears 21 and 24, thus making it possible to control the rotational direction. In addition, rotations are decelerated and transmitted through the intermittent rotation mechanism in the present invention. This is the same functionality as a motor having gears which has a conventional decelerating gear train. In the intermittent rotation mechanism of the present invention, the deceleration ratio can be easily changed by variously setting the number of the tooth 40a of the primary gear 22 in the first gear 21. When the rotation is not transmitted, that is, when tooth 40a comes in contact with the transmitting unit 51, the tooth 40a traces gently following the tooth profile, thus preventing clashing noise which is normally generated when using a lever for preventing reversed rotations.

Next, a second embodiment of the present invention will be described referring to the FIGS. 10 through 14. The form of the second embodiment is a motor having gears, in which an intermittent rotation mechanism is changed but other components remain the same as those of the first embodiment. In the second embodiment, a one-way rotation is achieved by modifying the secondary gear in the intermittent rotation mechanism. Note that the components which are the same as those in the first embodiment have the same element numbers.

A first gear 45 has a gear unit 20 and a primary gear 22. As shown in FIG. 10, provided to the primary gear 22 are a tooth unit 40 which meshes with a secondary gear 23 in a second gear 46, and a control unit 41 for stopping the second gear 46. Two teeth 40a and 40b are provided at both sides of a tooth-shaped hole 42 so that the tooth unit 40 is made symmetric. An intermittent rotation mechanism comprises the primary gear 22 and the secondary gear 23. The diameter at the root of the tooth unit 40 is smaller than that of the control unit 41.

Figure 11:
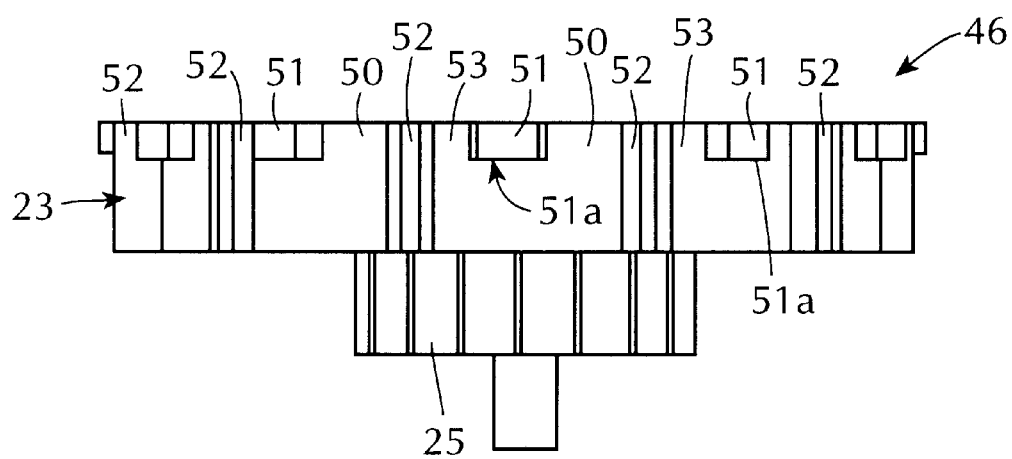
FIG. 11 illustrates a side view of the second gear of the motor having gears of the second embodiment of the present invention.
Figure 12:
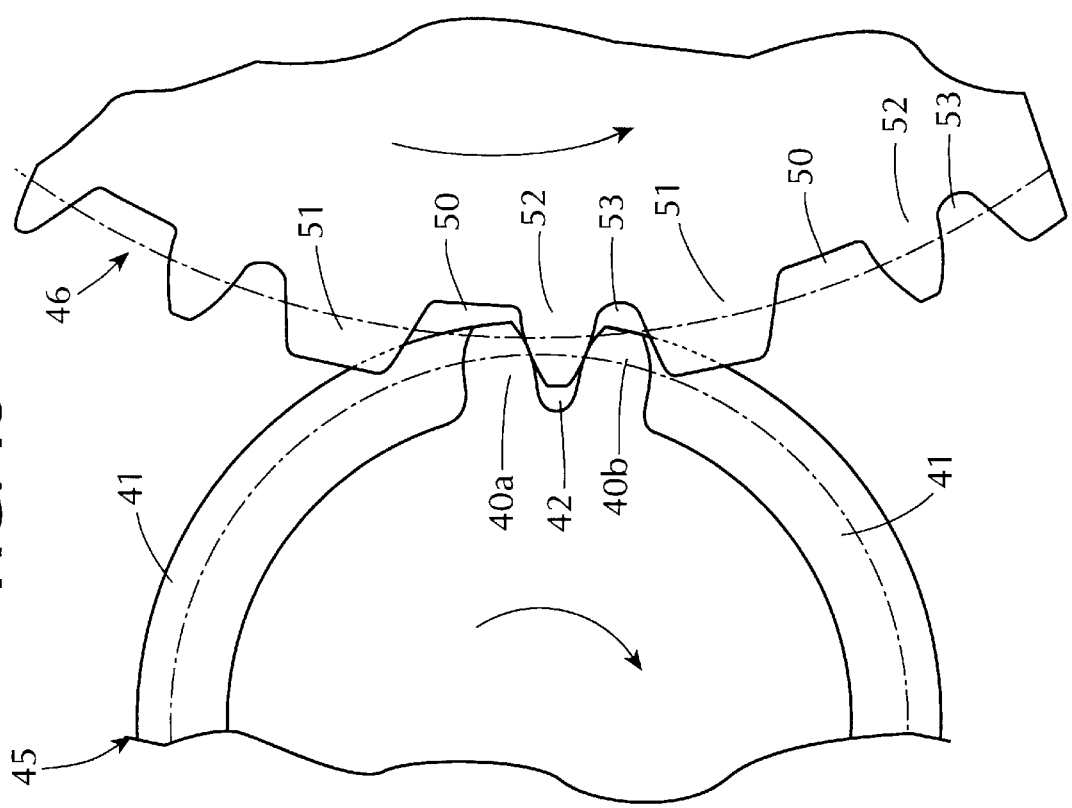
FIG. 12 is a drawing illustrating the condition when rotation is transmitted from the first gear to the second gear of the motor having gears in the second embodiment of the present invention, showing the condition right before meshing.
Figure 13:
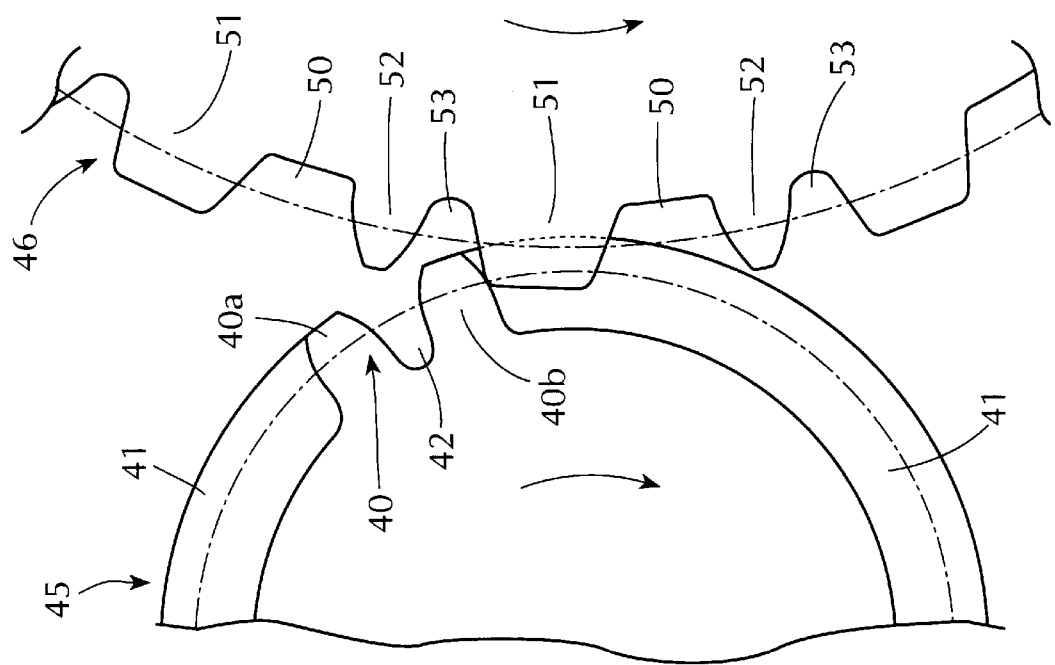
FIG. 13 is a drawing illustrating the condition when rotation is transmitted from the first gear to the second gear of the motor having gears in the second embodiment of the present invention, showing the meshed condition.
Figure 14:
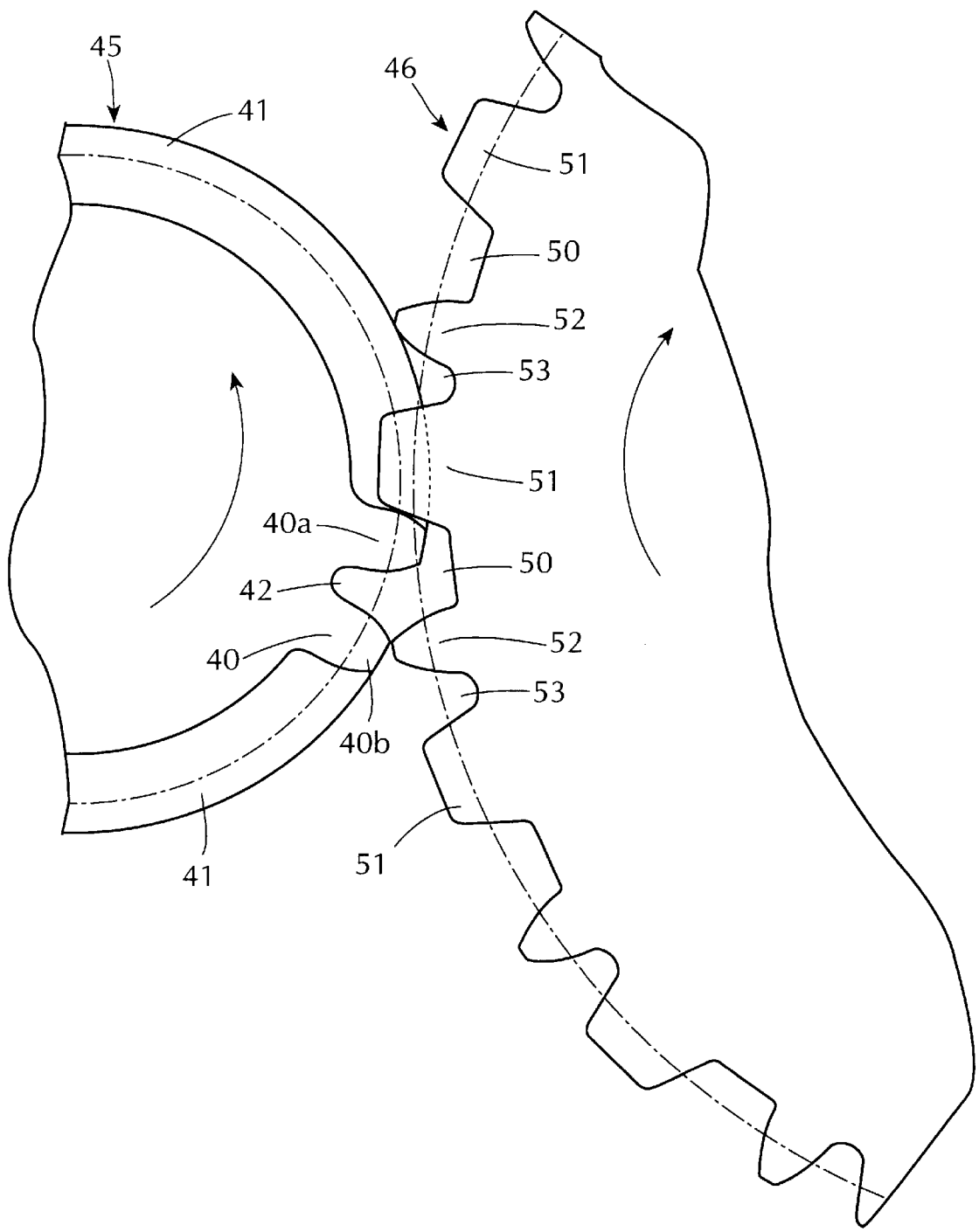
FIG. 14 is a drawing illustrating the condition when rotation is not transmitted from the first gear to the second gear of the motor having gears in the second embodiment of the present invention.
Figure 15:
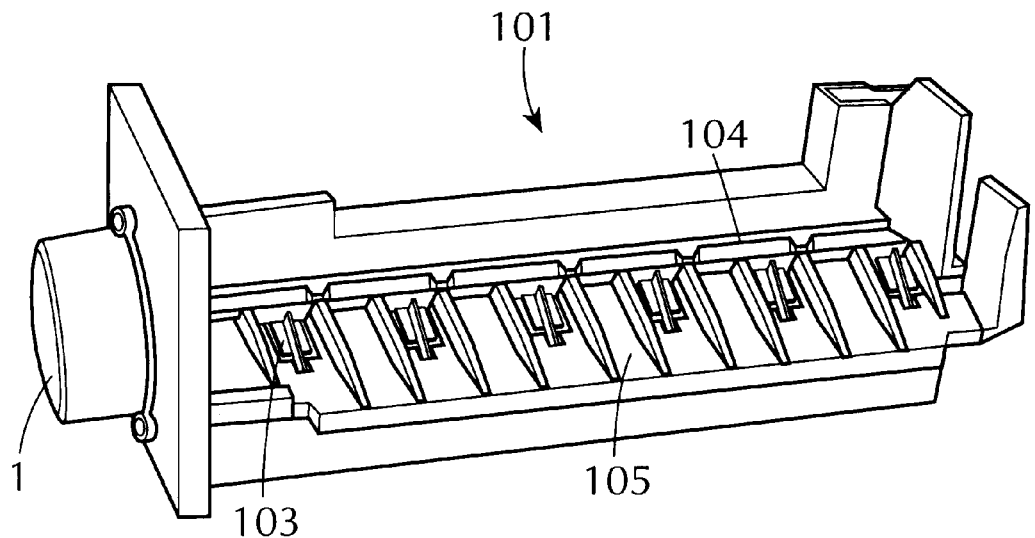
FIG. 15 illustrates a perspective view of a major portion of an ice maker to which a motor having gears of the present invention is installed.

The second gear 46 has secondary gear 23 and a pinion unit 25. As shown in FIG. 11, secondary gear 23 includes a second fitting unit 53 with which tooth 40b of the tooth unit 40 mesh when the first gear 45 rotates counterclockwise in FIG. 1, a transmitting unit 51 to which the rotation is transmitted via the tooth 40b, a meshing tooth 52 which fits into the tooth-shaped hole 42, and a first fitting unit 50 with which the tooth 40a meshes. The meshing tooth 52 and the transmitting units 51 arranged at both sides thereof constitutes a meshing tooth unit; the first fitting unit 50 is made by notching one of the transmitting units 51. The first fitting unit 50 is made wider than the second fitting unit 53 and asymmetric around the meshing tooth 52. For this reason, when first gear 45 rotates counterclockwise in FIG. 1, tooth 40a of the tooth unit 40 meshes but tooth 40b runs against meshing tooth 52 as shown in FIG. 14. This stops the rotation in the predetermined direction, and then first gear 45 starts rotating in reverse. On the other hand, when first gear 45 rotates clockwise in FIG. 1, the rotation is transmitted as shown in FIGS. 12 and 13, and then second gear 46 rotates intermittently.

Note that while first and second gears 45 and 46 are not transmitting the rotation, the outer circle surface of the control unit 41 of first gear 45 contacts the two meshing teeth 52 and 52 of the second gear 46, thus preventing the second gear 24 from rotating. Further, at this time, a bottom surface 51 a of the transmitting unit 51 of the second gear 46 is opposite a top surface 41 a of the control unit 41. Moreover, teeth 40a and 40b have an involute tooth profile, and each meshing with tooth 52 which contacts teeth 40a and 40b and a contact surface of the transmitting unit 51 have also an involute tooth profile; however, other tooth profiles may be used. In the second embodiment, the rotation is controlled in an opposite direction from that of the first embodiment. However, one (the opposite) side of the transmitting unit 51, that is, the second fitting unit 53 may be notched wider than the first fitting unit 50 to make it asymmetric around the meshing tooth 52 so that the rotation is controlled in the same direction as the first embodiment.

Note that in each embodiment, the primary and secondary gears, 22 and 23, are made of polyacetal resin so that clashing noise is further prevented from being generated; however, they may be made of metal. Also, in each embodiment, the first gear 21 or 24, the second gear 24 or 46, the third gear 27, and the fourth gear 30 are all made of polyacetal so as to make the gears light and work quietly, but all or a part of them may be made of metal. Further, the output shaft 19 is formed of 66 nylon resin so that it has an excellent insulating capability; however, it may be made of metal in the same manner.

The intermittent rotation mechanism used in each embodiment is capable of increasing the deceleration ratio as compared to a conventional decelerating gear and decreasing a rotational torque of the output shaft 19 a little as compared to a gear of the same size as that of the present invention. Therefore, it is extremely advantageous for decreasing the number of rotations to a great extent without greatly decreasing the rotational torque to the same extent.

Note that the above mentioned forms of the embodiments are preferred examples of the present invention; however, the forms of the embodiments are not so limited. The form of embodiment is variously modifiable within the scope of the present invention. For example, the intermittent rotation mechanism may be arranged not between the first gear 21 or 45 and the second gear 24 or 46, but in other unit such as the portion between the second gear 24 or 46 and the third gear 27. Also, it may be arranged not in the decelerating gear train, but within a gear mechanism which provides acceleration on the whole. Moreover, tooth unit 40 may be provided at not only one place but at two or more places. In addition, the tooth unit 40 in the first embodiment may be made of not only one but of multiple teeth.

In the above forms of the embodiments, the motor unit is an AC sync motor; however, the present invention can be applied to other motors, for example, various motors having gears such as stepping motors in which a gear mechanism is installed to a motor rotatable in both directions.

Furthermore, the present invention can be applied to a motor, such as an inductive motor, which rotates in a constant direction. In this case, the rotation in the direction to which it should not be transmitted when the rotor is rotated manually is surely prevented. Also, the rotation on the output side can be prevented by the intermittent rotation mechanism unit.

Next, an embodiment, in which the above mentioned motor having gears 1 is installed in an ice maker, will be described referring to FIGS. 15 through 18.

Ice maker 101, as illustrated in FIGS. 15 through 18, comprises the above mentioned motor having gears 1, an ice removing member 103 driven by the motor having gears 1, an ice making portion 104 for making ice of water which is poured therein, and an ice guiding member 105 for sliding and dropping ice removed from the ice making portion 104 into an ice storage container (not illustrated).

The motor having gears 1 includes an AC compact electric motor portion and a gear portion to which a decelerating gear train, cam, etc. are installed. An output gear portion 35 of the output shaft 39 is connected to the ice removing member 103 of the ice maker 101. Note that a detailed configuration of the motor having gears 1 is described as above, and its description is omitted here.

Figure 16:
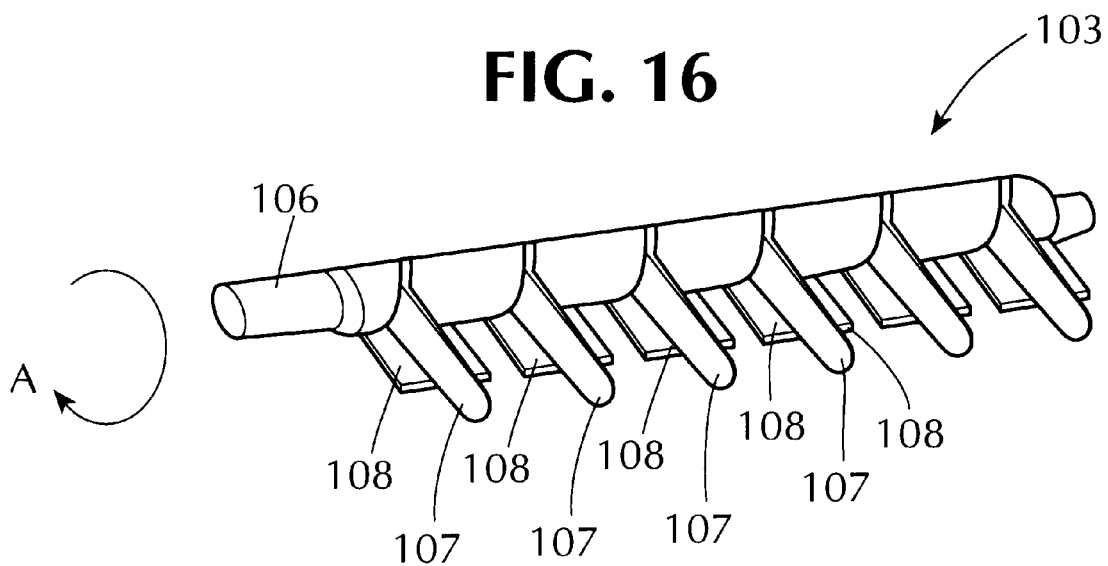
FIG. 16 illustrates a perspective view of an ice removing member used in the ice maker of FIG. 15.

The ice removing member 103, as illustrated in FIG. 16, has a plurality of paddles for removing ice 107, projecting toward the outer circumference, on an rotating shaft 106. Each of the paddles for removing ice 107 is supported by a reinforcing portion 108 at both sides thereof, and is rotated by 360° at once in arrow A direction by the motor having gears 1. Besides functioning as reinforcements so that the paddle for removing ice 107 are not broken or do not come off, the reinforcing portions 108 functions to place the removed ice thereon and slides and transfer it to the ice guiding member 105 side.

Figure 17:
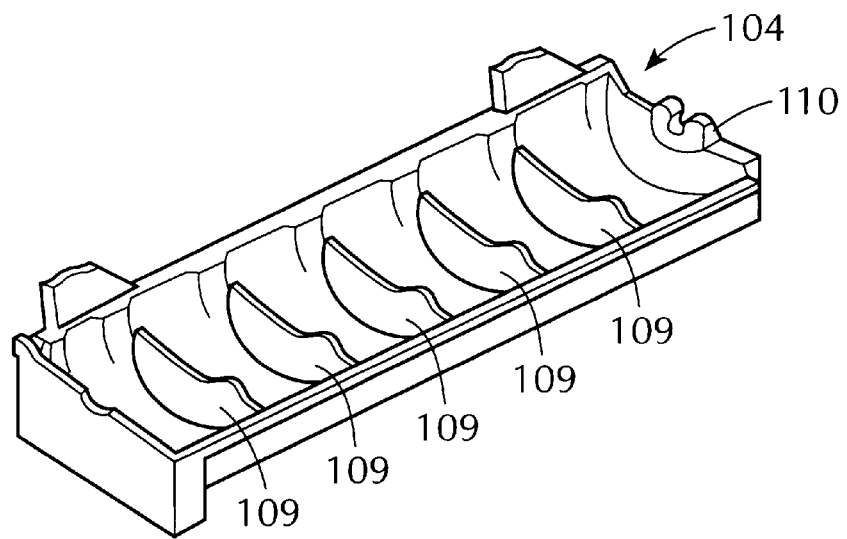
FIG. 17 illustrates a perspective view of an ice making portion used in the ice maker of FIG. 15.

A heater (not illustrated) is built-in below the ice making portion 104 illustrated in FIG. 17 to facilitate to remove ice in the ice making portion 104. In the ice making portion 104, a plurality of partitions 109 are provided, and a bearing member 110 which bears the rotating shaft 106 of the ice removing member 103 is provided on a side opposite to the side to which the motor having gears I is mounted.

Figure 18:
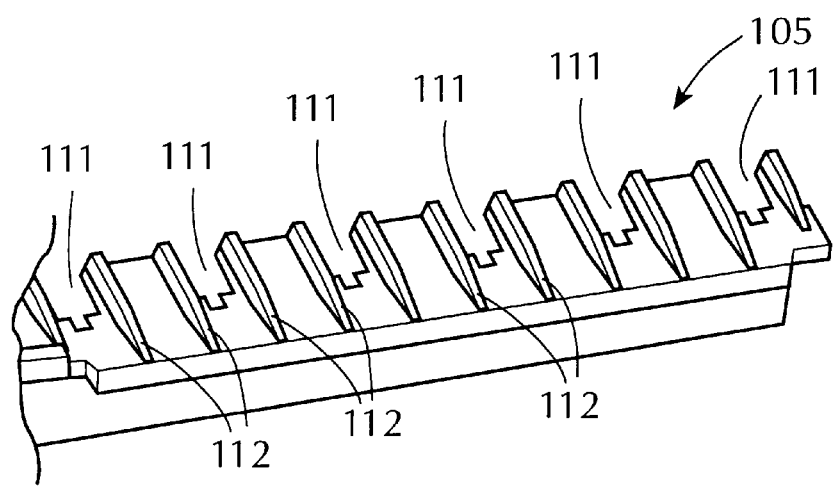
FIG. 18 illustrates a perspective view of a major portion of an ice guiding member used in the ice maker of FIG. 15.

The ice guiding member 105, as shown in FIG. 18, has a plurality of notches 111 through which the paddles for removing ice 107 of the ice removing member 103 pass, and wing-like sliders 112 which slides and transfer the ice.

The ice maker 101 and motor having gears 1 configured in the above manner perform in the following manner.

When a control unit (not illustrated) in a refrigerator sends a signal for removing ice in the ice making portion 104, the heater at the ice making portion 104 is first conducted to meld ice stuck on the bottom of the ice making portion 104. Meanwhile, the motor having gears 1 starts to be conducted.

When the stator substrates 2 and 6 are excited by the coil wire 5, the rotor 7 rotates in either direction through a magnetic mutual action. When the rotor 7 rotates clockwise in FIG. 1 at this time, the first gear 21 rotates counterclockwise. Then, as shown in FIGS. 7 and 8, the tooth 40a meshes with the first fitting unit 50 and transmits the rotation to the transmitting unit 51 to rotate the second gear 24 clockwise. With the transmitted rotation, the meshing tooth 52 meshes with the tooth-shaped hole 42, and thus the rotation continues. Once the tooth 40a come out from the first fitting unit 50, the outer circle surface of the control unit 41 contacts the two meshing teeth 52 and 52, thus preventing the second gear 24 from rotating. Meanwhile, the gear 21 continues rotating; the tooth 40a comes close to the second gear 24 again, and then it meshes with the next first fitting unit 50. In this manner, the second gear 24 rotates intermittently. This decelerates the rotation to a great extent when it is transmitted from the first gear 21 to the second gear 24. The rotation of the rotor 7 is transmitted to the output shaft 19 via the gear mechanism 8, which is a decelerating gear train made of the gears 21, 24, 27, and 30; then, it is transmitted, as a rotational action, to a member to be driven. On the other hand, when the rotor 7 rotates counterclockwise in FIG. 1, the first gear 21 rotates clockwise. Then, as shown in FIG. 9, the tooth 40a meshes the second fitting unit 53 and tends to push the transmitting unit 51 thereadjacent in the rotating direction. However, the meshing tooth 52 adjacent to the second fitting unit 53 comes in contact with the outer circle of the control unit 41, thus stopping the rotation of the second gear 24. As a result, the rotor 7 starts rotating in reverse. In other words, the rotor 7 starts rotating clockwise in FIG. 1, and then the first gear 21 rotates counterclockwise. With this, the tooth 40a meshes with the first fitting unit 50 provided opposite the second fitting unit 53 interposing the transmitting unit 51, making it possible to transmit the rotations.

As described, even when the rotor 7 rotates in either direction, the rotation in only the predetermined direction is transmitted due to the intermittent rotation mechanism comprising the first and second gears 21 and 24, thus making it possible to control the rotational direction. In addition, rotations are decelerated and transmitted through the intermittent rotation mechanism in the present invention. This is the same functionality as a motor having gears which has a conventional decelerating gear train. In the intermittent rotation mechanism of the present invention, the deceleration ratio can be easily changed by variously setting the number of the tooth 40a of the primary gear 22 in the first gear 21. When the rotation is not transmitted, that is, when the tooth 40a comes into contact with the transmitting unit 51, the tooth 40a traces gently following the tooth profile, thus preventing clashing noise which is normally generated when using a lever for preventing reversed rotations.

When the output shaft 19 starts rotating in a predetermined direction, the ice removing member 103 connected to the output shaft 19 attempts to rotate in a direction indicted by arrow A in FIG. 16. Since the heater at the ice making portion 104 is not effective immediately, ice in the ice making portion 104 is still sticking to the bottom of the ice making portion 104. Therefore, the motor having gears 1 comes into a so-called locked state. However, because the motor portion is an AC compact sync motor, the current increase or heat generation can be prevented. In addition, because an intermittent rotation mechanism is provided, the output shaft 19 produces low torque while rotating at low speed. For this reason, even in the locked state, torque exerting on each gear in the gear mechanism 8 does not become large, thus preventing damages such as breaking teeth.

After a predetermined period passes and the boundary between ice and the ice making tray starts melting, torque on the ice removing member 103 exceeds the sticking strength between ice and the ice making portion 104. With this, the ice removing member 103 rotates in a direction indicated by arrow A in FIG. 16. Then, ice in the ice making portion 104 is dropped into the ice storage container. After this, water is supplied to the empty ice making portion 104. Water supply is controlled by a cam in the motor having gears 1 and a micro-switch (both not illustrated). This control should be performed with a high precision. In other words, with low control precision, water may overflow from the ice making portion 104, or on the other hand, only very little ice will be made. In the motor having gears 1, the cam is actuated via the intermittent rotating mechanism to solve the above problems. Precise time for supplying water can be set in the following way. Either one of or both of the operations of switching on-off and off-on for water supply is set to occur at the place where the intermittent rotation mechanism is operated.

As described above, the embodiment of ice maker 101 has used the motor having gears 1 according to FIGS. 1 through 9. However, the motor having gears according to FIGS. 10 through 14 may be installed in the ice maker 101.

Each of the gears 21, 24, 27, 30 in the motor having gears 1 is a compounded gear (two-storied gear), which is axially thicker than a one-storied gear. By changing the gears to one-storied gears, the motor having gears 1 can be made thinner.

In the embodiment of ice maker 101, although the primary gear 22 and secondary gear 23 are made of polyacetal resin which contributes to less generation of popping noise, it may be made of metal. Also in this embodiment, the first gears 21 and 45, second gears 24 and 26, third gear 27, and fourth gear 30 are all formed of polyacetal which contributes to light weight and less noise. However, all of or a part of them may be made of metal.

Although the output shaft 19 is made of resin containing 66 nylon so as to be excellent in insulation capability, it may be made of metal as well.

Note that in this embodiment, the first gears 21 and 45 and second gears 24 and 46 are preferably colored white, the third gear 27 is colored red, and the fourth gear 30 and output gear 19 are colored gray to prevent errors in assembly. However, they all may be colored the same.

Ice maker 101 may also be configured such that the motor having gears 1 is actuated after a predetermined period upon conducting the heater. Also in this case, ice may not be sufficiently melted depending on how long the heater is conducted, risking a so-called "locked" condition. Using the motor having gears I described in the above embodiments, however, the gears in the gear mechanism 8 will not be damaged.

Further, the motor having gears 1 can be applied to various motor units which rotate at low speed and do not require high torque very much. In addition, if the motor having gears of the present invention is applied to a motor unit that causes a so-called locked condition, that is, the driving member such as the ice removing member 103 connected to the output shaft 19 is locked, the gears in the gear mechanism 8 can be prevented from being damaged even when a locked condition occurs. This results in prolonging the usable life of the motor unit.

When the cam and micro-switch in the motor having gears 1 are actuated to stop supplying water, the conducting of the motor having gears 1 is stopped after a slight delay. Consequently the rotor 7 stops rotating at a position at which tooth unit 40 of the primary gear 22 in the intermittent rotating mechanism and the tooth of the secondary gear 23 do not mesh with each other. With this configuration, when the rotor 7 is started up next time, the primary gear 22 starts rotating at the position where tooth unit 40 is not meshed with the tooth of the secondary gear 23. This is called a free rotation, which provides a smooth startup. Note that in order to stop the rotor 7 at the position where tooth 40 and the tooth of the secondary gear 23 are not meshed with each other in this manner, various methods such as one using inertia of the rotor 7 can be employed as well as the delaying method.

The intermittent rotation mechanism may be provided in the gear portion close to the output shaft 19. With this arrangement, rotations of the ice removing member 103 connected to the output shaft 19 become intermittent with accelerating movements, making it possible to generate a large torque momentarily. As the drive member for the ice maker 101, a drive member, such as a twisting member for twisting an ice making dish itself or an ice crusher for crashing ice in an ice storage container, can be used besides the ice removing member 103 and the like.

As described above, the motor having gears in the present invention can control the rotation of the rotor in a predetermined direction without deforming the shape of a motor unit or adding a mechanism such as a lever for preventing reversed rotations. For this reason, the structure remains simple and the number of components stays small, thus facilitating building up motors and contributing to low cost. In addition, since the teeth of the gears make contact with each other when the rotor rotates in reverse, clashing noise, which is normally generated when using a lever for preventing reversed rotations, is not produced, providing a rotational direction control mechanism which works quietly.

As described above, the present invention can provide, without attempting to change the shape, a motor having gears, which rotates at low speed and does not require a large torque. Therefore, it is not necessary to strengthen gears in a gear mechanism, the gears will not be damaged even if an output shaft is locked, and also the motor does not generate a heat.

In an ice maker using the above mentioned motor having gears, the gear mechanism will not be damaged even when the inside the ice making portion reaches below the freezing point and the driving members are frozen, or when ice sticks to the ice making portion disabling driving members to move during the removing of ice from the ice making portion. For this reason, the ice maker can have a long usable life. In addition, in the intermittent rotation mechanism (in which the secondary gear that meshes with the primary gear rotates intermittently) of the present invention, the output shaft does not require a high torque, regardless of rotating at low speed. Suppose that the drive member connected to the output shaft, whose output shaft portion requires a low torque, is frozen being in a locked state and cannot be driven. In such a case, the output shaft is stopped by force temporarily. However, upon eliminating the force, the output shaft starts rotating again to drive the drive member. Therefore, the intermittent rotation mechanism of the present invention can respond quickly to the condition of the drive member with stopping or rotating again, according to the load from the drive member which comes into a locked stated temporarily.

While the foregoing description and drawings represent the preferred embodiments of the present invention, it will be obvious to those skilled in the art that various changes and modifications may be made therein without departing from the true spirit and scope of the present invention.

What is claimed is:

1. An ice maker comprising:

a motor having gears which transmits rotations of a rotor to an output shaft through a gear mechanism made of gear trains, said gear mechanism being a speed reduction mechanism;

an ice making portion for making ice of water which is poured therein;

a drive member driven by said motor having gears for removing ice from said ice making portion, ice being made in said ice making portion;

an intermittent rotation mechanism including a primary gear which rotates upon receiving rotations of said rotor and a secondary gear which meshes with said primary gear and rotates intermittently, said gear train having said primary gear and said secondary gear so as to transmit rotation of the rotor to the output shaft;

said primary gear having only a single tooth for engaging said secondary gear, a tooth-shaped hole, which is provided adjacent to one side of said tooth and with which a meshing tooth of said secondary gear meshes, and a control unit provided adjacent to the other side of said tooth so as to stop said secondary gear from rotation for a given period;

wherein, when said primary gear rotates in a predetermined direction, said meshing tooth meshes with said tooth-shaped hole to intermittently rotate said secondary gear; and when said primary gear rotates in a direction opposite to said predetermined direction, said meshing tooth contacts said control unit to prevent rotation of said secondary gear and rotate said primary gear in said predetermined rotational direction, and said primary gear is rotated by said rotor, the rotation of said primary gear being transmitted to said secondary gear to make intermittent rotations of said secondary gear to said output shaft so that said output shaft is rotated by said secondary gear.

2. The ice maker as set forth in claim 1, further comprising an ice removing member driven by said motor having gears, and an ice guiding member for guiding ice removed from said ice making portion to an ice storage container.

3. The ice maker as set forth in claim 1, wherein rotations of said rotor are stopped at a position at which said tooth of said primary gear does not engage said secondary gear.

4. The ice maker as set forth in claim 1, wherein said primary gear is asymmetric about a cutting plane positioned axially with respect to the primary gear and bisecting said tooth;

wherein, when said primary gear rotates in a predetermined direction, said meshing tooth meshes with said tooth-shaped hole to intermittently rotate said secondary gear; and wherein, when said primary gear rotates in a direction opposite to said predetermined direction, said meshing tooth contacts said control unit to stop said secondary gear and said primary gear is rotated in reverse to rotate in said predetermined direction.

5. The ice maker as set forth in claim 1, wherein said tooth and said control unit are adjacent in the axial direction of said primary gear;

said secondary gear has a plurality of meshing teeth provided around an outer circumference of said secondary gear repeatedly;

said tooth-shaped hole is arranged at said control unit adjacent to said tooth; and said secondary gear including transmission units arranged at both sides of said meshing tooth.

6. An ice maker comprising:

a motor having gears which transmits rotations of a rotor to an output shaft through a gear mechanism made of gear trains, said gear mechanism being a speed reduction mechanism;

an ice making portion for making ice of water which is poured therein;

a drive member driven by said motor having gears for removing ice made in said ice making portion therefrom;

said gear trains being provided with an intermittent rotation mechanism including a primary gear which rotates upon receiving rotations of said rotor and a secondary gear which meshes with said primary gear and rotates intermittently; and said primary gear being provided with a tooth unit for driving said secondary gear, said tooth unit including at least one tooth and a tooth-shaped hole provided adjacent to said at least one tooth and with which a meshing tooth of said secondary gear meshes, and a control unit provided adjacent to said tooth unit for stopping said secondary gear for a given period, said tooth unit and said control unit overlapping in the axial direction of said primary gear;

wherein, when said primary gear rotates in a predetermined direction, said meshing tooth meshes with said tooth-shaped hole to intermittently rotate said secondary gear; and wherein said tooth-shaped hole, to which said meshing tooth of said secondary gear mesh when said primary gear rotates in said predetermined direction, is arranged at said control unit;

said tooth unit being arranged with said meshing tooth and transmitting units arranged at both sides of said meshing tooth; one of said transmitting units being notched such that said secondary gear is asymmetric around said meshing tooth, and said primary gear is rotated by said rotor, the rotation of said primary gear being transmitted to said secondary gear to make intermittent rotations of said second gear to said output shaft so that said output shaft is rotated by said secondary gear.

7. The ice maker as set forth in claim 6, wherein said tooth unit is made of two teeth, and said meshing tooth of said secondary gear runs against one of said two teeth of said tooth unit when said primary gear runs in said direction opposite to said predetermined direction.

* * * * *